United States Patent [19]

McCarty et al.

[11] Patent Number: 5,582,205
[45] Date of Patent: Dec. 10, 1996

[54] FILTERING FLOW IN A VALVE

[75] Inventors: William R. McCarty, St. Charles; Richard A. Donner, Geneva; Robert J. Cooper, West Dundee, all of Ill.

[73] Assignee: Eaton Corporation, Cleveland, Ohio

[21] Appl. No.: 424,026

[22] Filed: Apr. 18, 1995

[51] Int. Cl.⁶ .................................................. B01D 29/07
[52] U.S. Cl. .................... 137/545; 137/546; 137/549; 210/498
[58] Field of Search .................... 137/545, 546, 137/549; 210/498, 338, 342

[56] References Cited

U.S. PATENT DOCUMENTS

| 801,093 | 10/1905 | Koehler | 137/545 |
| 1,626,721 | 5/1927 | Cohn | 137/549 |
| 1,898,816 | 2/1933 | Crossen | 137/549 |
| 2,936,780 | 5/1960 | Pratt | 137/549 |
| 4,021,354 | 5/1977 | Lyon | 210/498 |

FOREIGN PATENT DOCUMENTS

| 1936382 | 5/1970 | Germany | 210/338 |
| 7379 | 4/1893 | United Kingdom | 210/338 |

*Primary Examiner*—A. Michael Chambers
*Attorney, Agent, or Firm*—Roger A. Johnston

[57] ABSTRACT

A unitary cup-shaped grid member having a grid of holes in the closed end is inserted in the inlet of a valve and a cup-shaped fine-mesh primary filter screen inserted therein and snap-locked in place. In the event the screen clogs and is removed by the user, the grid provides some back-up or auxiliary course filtering to protect the valve in service after removal of the primary filter screen.

2 Claims, 2 Drawing Sheets

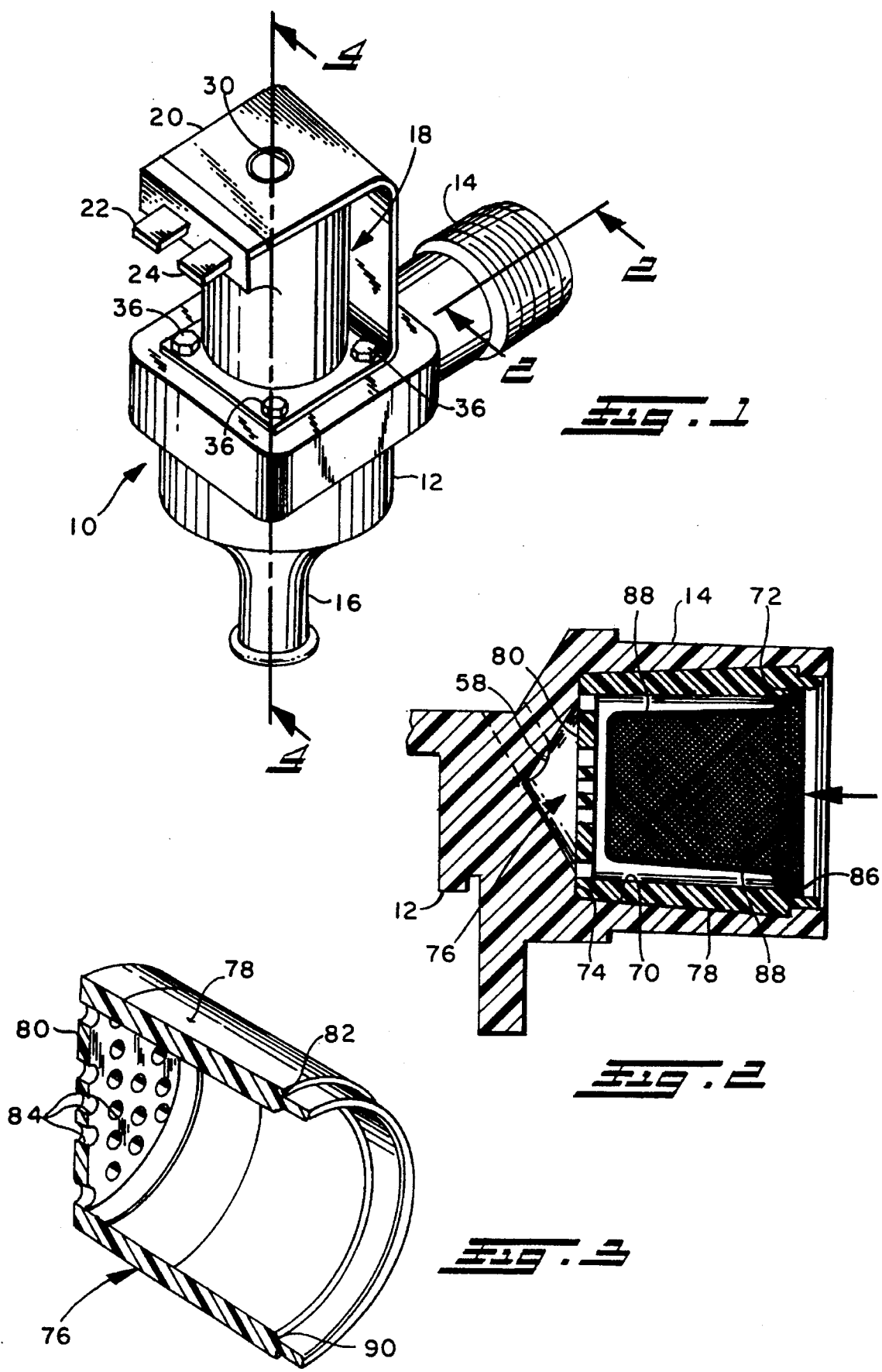

FILTERING FLOW IN A VALVE

BACKGROUND OF THE INVENTION

The present invention relates to filtering or trapping particles in the flow through a valve, particularly particles found in water flowing through an electrically operated valve of the type employed in appliances connected to a municipal or household water supply. Such valves are commonly used in controlling water flow in appliances such as dishwashers, clothes washing machines and refrigerator ice makers. Such appliance water valves typically are operated by a low-current solenoid operator with only a few ounces or grams of force available for opening and closing the valving element. Such valves are thus susceptible to the effects of small foreign particles in the water supply becoming trapped on the valve seat or between moving parts which results in failure of the valve to close and leakage.

Heretofore, filter screens having a fine mesh or small openings therein for trapping minute particles in the valve inlet have been employed to prevent such particles from becoming lodged between the movable valve member and the valve seat. However, the fine mesh of such wire filter screens has shown a propensity in service to become clogged with an accumulation of trapped particles from the water supply resulting in diminished or blocked flow to the valve. In order to remedy this situation, users have disconnected the valve from the water supply and forcibly removed the filter screen to permit flow into the valve. Once the filter screen has been removed from the valve, the valve is left unprotected from foreign particles; and, experience has shown that the valve is soon caused to leak from particles lodged between the valving member of the valve seat.

Thus, it has long been desired to provide a cost effective way of providing residual filtering or blockage of particles to a supply valve after deliberate removal of the primary filter screen by the user.

SUMMARY OF THE INVENTION

It is an object of the present invention to provide an auxiliary or backup filtering grid to protect a valve in service after user removal of a primary screen.

It is a further object of the invention to provide an auxiliary or backup filtering grid for a water flow valve having the grid formed in a cup-shape and snap-locked into the valve inlet with the filter screen snap-locked into the cup-shaped grid member.

The auxiliary or backup filter grid of the present invention comprises an integrally formed cup-shaped grid member having a plurality of spaced filtering apertures provided in the closed end of the cup-shape. The grid member is either press-fitted or snap-locked into the inlet of the valve. In the preferred practice, the cup-shaped member has a conically tapered side wall with an internal groove formed therein for receiving in press-fitting or snap-locking engagement the rim of a cup-shaped wire mesh screen primary filter.

BRIEF DESCRIPTION OF THE DRAWINGS

FIG. 1 is an axonometric view of an electrically operated valve assembly employing the present invention;

FIG. 2 is a portion of a section view taken along section indicating lines 2—2 of FIG. 1;

FIG. 3 is a portion of an isometric view of the unitary filter grid of the present invention; and, FIG. 4 is a section view taken along section indicating lines 4—4 of FIG. 1.

DETAILED DESCRIPTION

Figure 4:
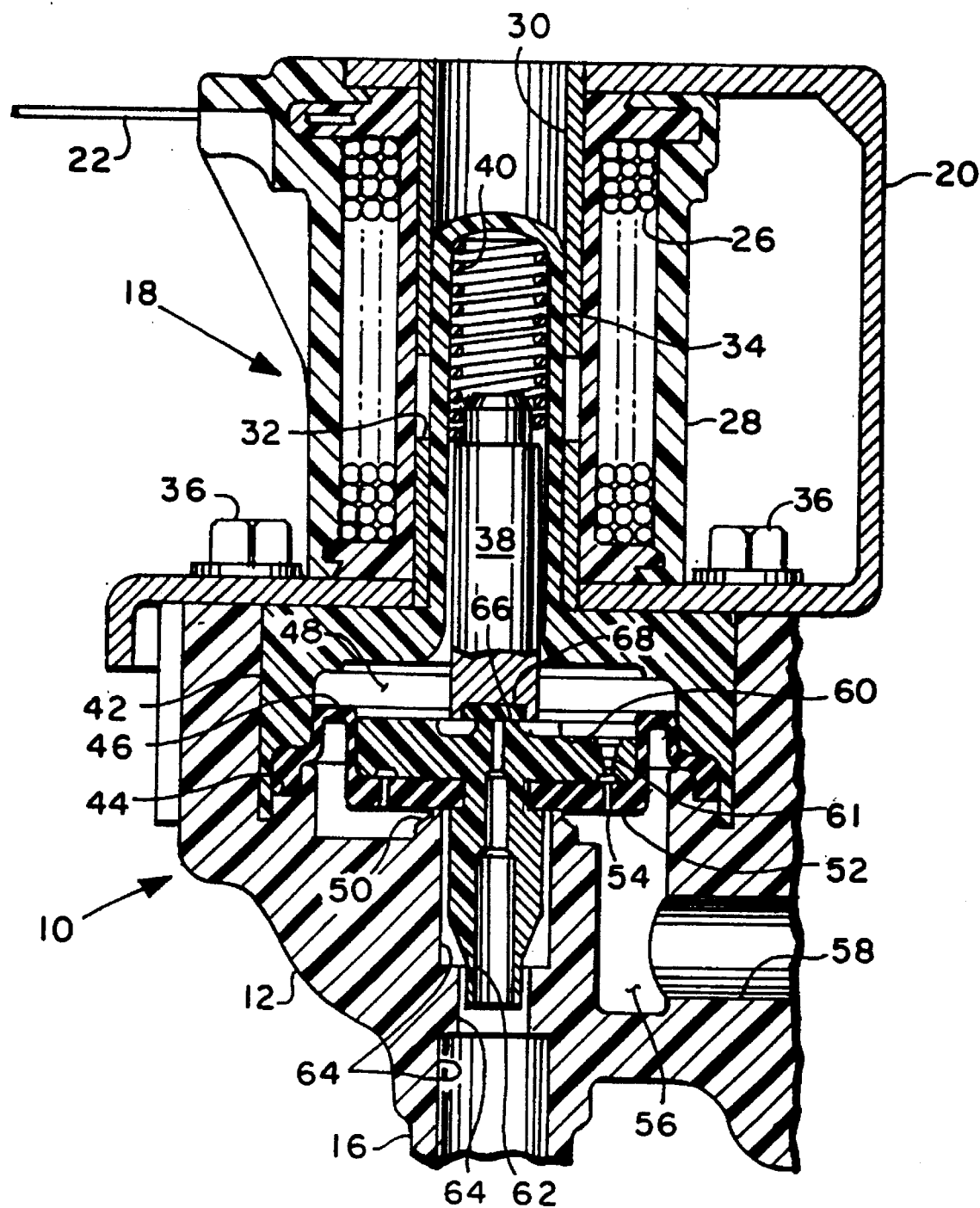

Referring to FIGS. 1 and 4, a electrically operated valve assembly indicated generally at 10 includes a valve body 12 having an inlet fitting 14, an outlet fitting 16 and a solenoid operator 18 having a magnetic pole frame 20 with electrical terminals 22, 24 for connection of the solenoid to be a source of power. The solenoid 18 includes a coil of electrically conductive wire 26 encapsulated in insulating material such as plastic denoted by reference numeral 28 and having tubular pole pieces 30, 32 disposed within the coil and spaced axially to define an air gap therebetween. The tubular pole pieces 30, 32 extend toward each other between the opposite ends of the generally C-shaped pole frame 20.

An armature guide tube 34 having a closed end which extends upwardly into the pivoted pole pieces 30, 32 is provided and has slidably received therein an armature member 38 biased in a downward direction by a spring 40. The spring 40 has the upper end thereof registered against the undersurface of the closed end of guide 34 and the lower end thereof piloted on the upper end of the armature. The pole frame 20 is secured to body 12 by any suitable fastening expedient as for example screws 36.

The lower end of the armature guide 34, opposite the upper closed end, has an enlarged diameter portion 42 which is received in a cavity formed in the body 12 and sealed therein. The bead rim 44 of a flexible diaphragm 46 comprises a resilient seal ring which seals the diaphragm in the body and forms a pilot cavity 48 above the diaphragm. The center portion of the diaphragm is somewhat thickened and the undersurface thereof forms a valve member for seating against a valve seat 50 formed in the body. The thickened portion of the diaphragm forming the valve member is denoted by reference numeral 52 in FIG. 4. The valve member 52 has at least one and preferably a plurality of relatively small diameter bleed holes 54 formed therethrough for permitting limited flow from the main valving chamber 56 formed on the under side of the diaphragm. It will be understood that the rigid insert 60 has a corresponding bleed passage 61 disposed to communicate with the bleed hole 54 formed in the valve member 52 for providing communication to the pilot valving chamber 48. The main valving chamber 56 communicates with an inlet passage 58 formed in the valve body. The valve member portion of the diaphragm has a rigid insert 60 which has formed therethrough a central pilot passage 62 which communicates with the outlet passage 64 of the valve body. The upper end of the pilot passage 62 in insert 60 has a pilot valve seat 66 formed therearound against which is seated a pilot valve member 68 attached to the end of armature 38.

In operation, upon energization of coil 26, the magnetic forces acting on armature 38 overcome the bias of spring 40 and move the armature upward raising pilot valve member 68 from the pilot seat 66 and permitting fluid in the pilot chamber 48 to flow outward through the outlet 68. The loss of fluid pressure in pilot chamber 48 causes the fluid pressure in main valving chamber 56 acting across the under surface of the diaphragm 46 to move the valve member 52 upward thereby opening flow through the main valve seat 50. Upon de-energization of coil 26, the pilot valve member 68 under the bias of spring 40 closes against pilot seat 66 and bleed flow through diaphragm holes 54 equalizes the pressure across the diaphragm permitting the spring 40 to urge the diaphragm and valve member 52 against the main valve seat 50 to close the valve.

Referring to FIG. 2, the inlet fitting 14 of the valve is shown as having a slightly conically tapered bore 70 formed therein which communicates with the inlet passage 58 to the valving chamber 56 (see FIG. 1). The tapered bore 70 has an annular undercut portion 72 formed near the open end thereof. The inner end of the bore 70 has a shoulder or flat bottom 74 adapted for registration thereagainst.

Referring to FIGS. 2 and 3, a filter grid member indicated generally at 76 having a generally cup-shaped configuration has the outer cylindrical surface 78 thereof tapered and sized to closely interfit the tapered bore 70 in the valve body 12. The cup-shaped grid member 76 has the closed end thereof formed to a generally flat surface configuration as denoted by reference numeral 80; and, upon insertion of member 76 in bore 70 the annular periphery of flat surface 80 is registered on the shoulder 74 in the valve body 12. The rim of the cup-shaped member 76 adjacent the open end thereof has a shoulder or relieved portion 82 formed thereon which is snap-locked into the under cut 72 formed in the bore 70. The closed end 80 of the cup-shaped member 76 has a plurality of apertures 84 formed therein in spaced arrangement and sized to permit particles greater than a predetermined size to be trapped on the face of the closed end of the grid. In the presently preferred practice, the apertures have a length-to-width ratio of at least 0.8; and, the grid apertures are preferably spaced center-to-center at least 1.8 times the width or diameter thereof. In the presently preferred practice, the filter grid cup inner periphery has an axial length-to-transverse width or diameter ratio of at least 1.0; and, the cup is preferably formed integrally of molded plastic material.

The inner periphery of the cup-shaped member 76 adjacent the open end or rim thereof has an annular ridge or shoulder 90 formed thereabout for registration of the rim 86 of a cup-shaped screen member 88 therein. In the presently preferred practice, the cup-shaped grid member 76 is first installed in the bore 70 in the valve block 12; and, subsequently the filter screen 88 is installed therein. However, it will be understood that if desired, the filter screen may first be assembled into the cup-shaped member 76 with the rim of the screen 86 registered against the shoulder 90 formed in the cup-shaped grid member thereby forming a subassembly of the screen and grid which may then be installed in the bore 70 in the valve body.

The present invention thus provides an auxiliary or backup filter grid for a filter screen employed for filtering foreign particles in the flow entering a valve. The grid is formed as a unitary cup-shaped member insertable in the inlet with the primary filter screen insertable therein. The arrangement of the filter screen of the present invention remains in the valve inlet in the event the screen clogs and is removed. The grid then provides some, albeit a courser, measure of filtering in the absence of the screen.

Although the invention has herein above been described with respect to the illustrated embodiments, it will be understood that the invention is capable of modification and variation and is limited only by the following claims.

We claim:

1. A filter grid for a valve inlet comprising: an integrally formed unitary generally cup-shaped member having an unperforated cylindrical inlet wall portion and a generally flat transverse end wall formed therewith (i) said end wall having a plurality of spaced apertures therein with each aperture having a predetermined flow area for trapping particles of a desired size, (ii) said cylindrical wall section having a substantial portion of the outer surface thereof tapered in the axial direction and adapted for installation in a tapered bore wherein said cylindrical inlet wall portion has a granular groove formed about the open rim thereof; and further comprising a cup-shaped screen having portions of the rim thereof registered in said groove.

2. A valve assembly comprising:

(a) a body having an inlet adapted for connection to a fluid source communicating with a valving chamber which communicates with an outlet;

(b) a valve member disposed in said valving chamber and moveable between a closed position blocking fluid flow between said inlet and outlet and an open position permitting fluid flow between said inlet and outlet;

(c) a filter grid member having a generally cup-shaped configuration and formed integrally with a plurality of apertures formed in the closed end thereof, said grid member received in said inlet and registered therein; and, (d) a generally cup-shaped filter screen received in said cup-shaped grid member, said screen having a mesh significantly finer than said grid apertures wherein said grid member has an annular groove formed about the open rim thereof with said screen having portions of the rim thereof registered in said groove.

\* \* \* \* \*

UNITED STATES PATENT AND TRADEMARK OFFICE
CERTIFICATE OF CORRECTION

PATENT NO. : 5,582,205

DATED : December 10, 1996

INVENTOR(S) : McCarty et al.

It is certified that error appears in the above-indentified patent and that said Letters Patent is hereby corrected as shown below:

In Column 4, line 24: "a granular" should read --- an annular ---

Signed and Sealed this

Seventeenth Day of June, 1997

Attest:

BRUCE LEHMAN

Attesting Officer

Commissioner of Patents and Trademarks